United States Patent [19]

Jenny

[11] 3,805,645
[45] Apr. 23, 1974

[54] POWER DRIVE WRENCH

[76] Inventor: Ronald L. Jenny, 3556 Stoner Ave., Los Angeles, Calif. 90066

[22] Filed: Mar. 7, 1972

[21] Appl. No.: 232,599

[52] U.S. Cl............... 81/57.22, 81/52.4 A, 64/30 R
[51] Int. Cl............................................. B25b 21/00
[58] Field of Search........... 81/57.22, 57.14, 52.4 R, 81/52.4 A, 52, 57.11, 57.24, 57.3, 57.36, 57.4; 64/30 R, 30 C; 74/665 GA

[56] References Cited
UNITED STATES PATENTS

| | | | |
|---|---|---|---|
| 2,781,682 | 2/1957 | Herndon | 81/57.22 |
| 2,606,431 | 8/1952 | Elgin | 64/30 R |
| 2,973,118 | 2/1961 | Grise | 74/665 GA |
| 2,444,602 | 7/1948 | Hardie | 81/57.22 |

Primary Examiner—James L. Jones, Jr.
Assistant Examiner—James G. Smith
Attorney, Agent, or Firm—John E. Kelly, Pastoriza & Kelly

[57] ABSTRACT

A special wrench can be easily and swiftly used by a workman to simultaneously tighten dual fasteners of a pipe joint.

The wrench has a pair of torque release units coupled to a gear box from which an input drive shaft projects.

A portable motor such as a conventional electric drill can be removably coupled to the input drive shaft and selectively operated to simultaneously rotate the torque release units while they are engaged with corresponding fasteners.

4 Claims, 3 Drawing Figures

POWER DRIVE WRENCH

BACKGROUND OF THE INVENTION

This invention generally relates to pipe joint tightening devices and more specifically to a wrench for concurrently tightening multiple fasteners of a pipe joint.

Various pipe joints for securing adjacent pipe ends together include multiple fasteners that must be rotated in order to close the pipe joint and seal it against the pipe ends.

It is customary for plumbers, pipe fitters and other workman to torque the individual fasteners one at a time by way of ordinary wrenches or screwdrivers, power wrenches, power screwdrivers or the like.

When the fasteners are tightened individually it is difficult to seal the joint evenly and uniformly. One side of the joint may be too tight while the other side is too loose making the joint leakage prone. When the pipe joint is crooked, misshapen or misaligned these conditions tend to cause excessive stress and strain that may lead to immediate damage or early replacement or repair.

BRIEF SUMMARY OF THE PRESENT INVENTION

Briefly stated this invention comprehends a handy and easily operated wrench which may be used in conjunction with a portable electric drill or the like to simultaneously tighten adjacent fasteners of a pipe joint for example.

In its broadest aspects the power driven wrench includes a pair of torque release units having force transmitting elements structured to simultaneously engage fasteners of a pipe joint. An input drive shaft is arranged for being drivingly engaged by a prime mover such as an electric drill. A gear assembly interconnects the input drive shaft and the pair of torque release units. The gear assembly is operatively engaged with the torque release units in a manner so as to cause the force transmitting elements to simultaneously tighten fasteners of a pipe joint.

The torque release units are aligned in parallel, side-by-side relationship and each includes a barrel rotatably connected to the gear assembly and an output drive spindle partially inserted within and coupled to the barrel. Each torque release unit includes a clutch mechanism interconnecting the barrel and output drive shaft and a torque adjustment means for regulating the torque overload limit.

The clutch mechanism is a slip clutch having a coiled spring and a clutch plate. The barrel has a closed end adjacent the gear assembly that constitutes a first clutch surface engaging one face of the clutch plate. The output drive spindle has an enlarged head constituting a second clutch surface that engages the other face of the clutch plate. The coil spring surrounds a segment of the spindle and its opposite ends are urged against the spindle enlarged head and the torque adjustment means.

Preferably the force transmitting elements are socket heads. The gear assembly is encased by a housing that mounts a brace used for holding the wrench steady with respect to the prime mover.

The prime mover may be in the form of an electrical drill having a chuck secured to the input drive shaft. A clip may be connected to the brace so that a workman may hang the wrench from his belt.

BRIEF DESCRIPTION OF THE DRAWINGS

The numerous benefits and unique aspects of the present invention will be fully understood when the following detailed description is studied in conjunction with the drawings in which.

DETAILED DESCRIPTION OF THE PREFERRED EMBODIMENT

Figure 1:
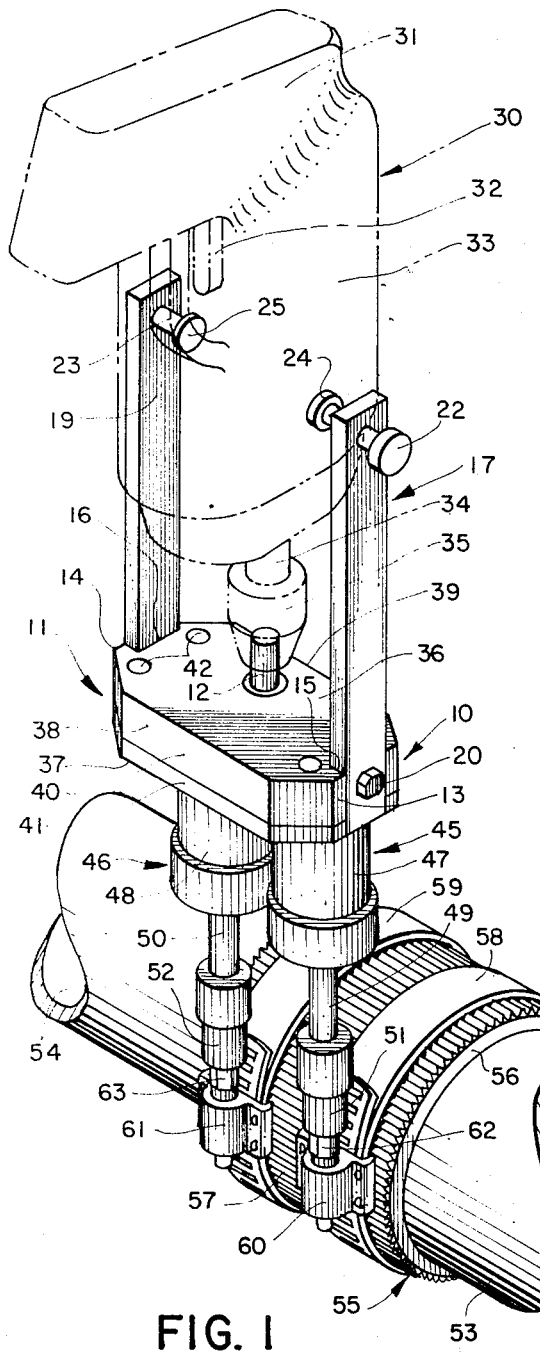
FIG. 1 is a perspective view of a power drive wrench constructed in accordance with this invention, showing the wrench secured to an electrical drill (shown in phantom lines) and prepared for use in tightening a pipe joint.

Referring primarily to FIG. 1, a power drive wrench 10 is shown with a gear box housing 11 of general octagonal shape. An input drive shaft 12 is journalled within and extends generally perpendicularly upright from the gear box housing 11. Housing 11 has a pair of relatively short side walls 13 and 14 formed with a pair of recesses that constitute vertically aligned locking slots 15 and 16.

A brace 17 is removably coupled to housing 11 and is constituted by a pair of brace arms 18 and 19 whose lower ends are fitted into the slots 15 and 16 respectively and locked therein by way of suitable fasteners such as bolts 20 and 21. The brace arms 18 and 19 are parallel to and equidistantly spaced from the input drive shaft 12. The upper ends of brace arms 18 and 19 carry clamping screws 22 and 23 whose mutually inward tips mount rubber contact pads or grommets 24 and 25.

Positioned partially within the space defined by brace 17 is a conventional portable electrical powered drill 30 which alternatively could be any suitable lightweight portable prime mover such as a motor. Power drill 30 has a handle 31, trigger 32 and central housing 33 whose opposing sides are tightly engaged by the clamping screws 22 and 23 in order to hold wrench 10 steady relative to drill 30.

The drill 30 has a power driven shaft 34 and is equipped with a chuck 35 secured to the shaft 34. Drive shaft 12 of the wrench 10 is tightly clamped within the chuck 35 so that rotary motion can be transmitted from drill 30 to wrench 10.

The gear box housing 11 has a top wall 36, a bottom wall 37 and a pair of relatively long side walls 38 and 39 which are joined to the relatively short side walls 13 and 14 by way of beveled corner walls. The housing 11 is divided into a removable top section 40 and lower section or plate 41. These sections can be separated from one another by removing bolts 42.

Depending from the gear box housing 11 is a pair of torque release units 45 and 46 that are arranged in side-by-side, parallel relationship and are identically constructed. The torque release units 45 and 46 have barrels 47 and 48 respectively which partially surround and encase dual output drive spindles 49 and 50 respectively. The distal or outermost tips of spindles 49 and 50 terminate in force transmitting elements shown in the form of wrench socket head 51 and 52. Alternatively the force transmitting elements could be screwdrivers or other mechanical devices capable of imparting rotary motion.

The power drive wrench 10 is structured so that it may be operated to simultaneously tighten a pair of adjacent fasteners such as screws or bolts. By way of illustration the power drive wrench 10 is illustrated being used in conjunction with a pipe joint 55 for coupling together cast iron pipes 53 and 54 having different diameters. One type of pipe joint with which the wrench 10 of this invention may be used and which is sometimes referred to as a "no-hub coupling" is disclosed in U.S. Pat. No. 3,233,922 to Evans et al.

The pipe joint 55 has an annular packing sleeve 56 constructed from resilient material such as neoprene. Adjacent ends of cast iron pipes 53 and 54 are slipped into opposing ends of sleeve 56 and then a clamping band 57 of flexible sheet material with transverse corrugations is wrapped around sleeve 56. A pair of compressing straps 58 and 59 are arranged to encircle the clamping band 57 and are spaced from one another by a distance sufficient to overlay pipes 53 and 54 respectively. Secured to the compressing straps 58 and 59 is a pair of tightening units 60 and 61 respectively which have fasteners 62 and 63 respectively. In order to tighten the pipe joint 55 the power drive wrench 10 may be operated to cause the wrench socket heads 51 and 52 to impart rotation to the fasteners 62 and 63.

Figure 2:
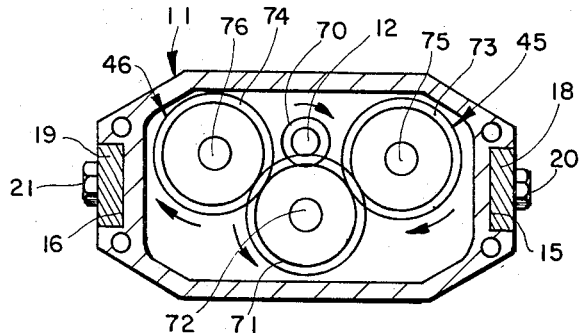
FIG. 2 is a cross-sectional view through the gear assembly and gear box taken along line 2—2 of FIG. 3; and, FIG. 3 is a front elevational, detailed, partially fragmentary view of the power drive wrench illustrated in FIG. 1, showing the coaction between important components.

Referring primarily to FIG. 2 which is a view of a portion of the gear assembly contained by the gear box housing 11, it can be seen that the input drive shaft 12 is fixed to an imput gear 70 arranged in meshing relationship with an intermediate gear 71 whose shaft 72 is suitably journalled within and confined by housing 11. Intermediate gear 71 is arranged to concurrently interengage a pair of similarly sized output gears 73 and 74 which are components of the torque release units 45 and 46, respectively. Output gears 73 and 74 are secured to stub shafts 75 and 76 that are fixed to the barrels 47 and 48 best shown in FIGS. 1 and 3. As indicated by the directional arrows, when input drive shaft 12 is rotated clockwise then the stub shafts 75 and 76 are also simultaneously rotated clockwise.

Figure 3:
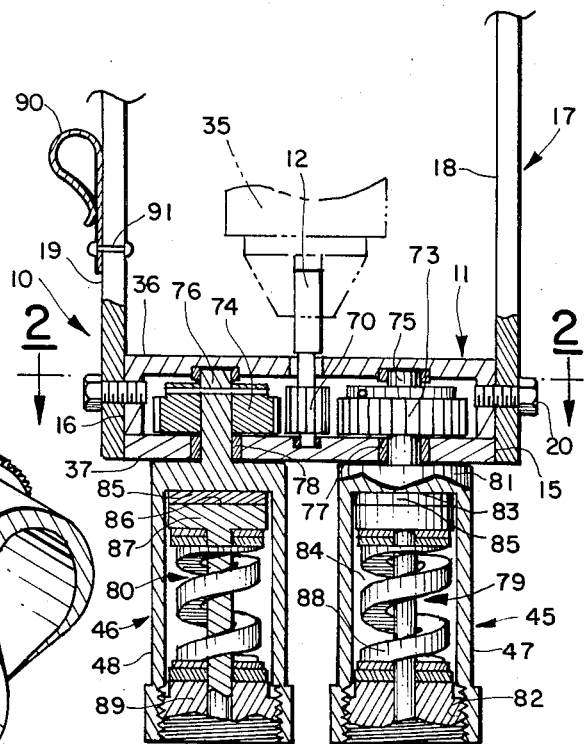
Figure 3:
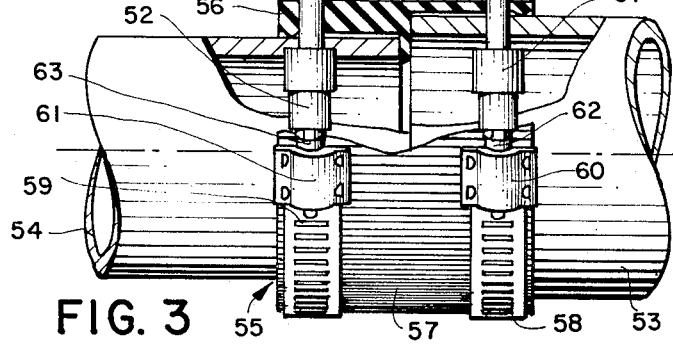

Referring primarily to FIG. 3 the stub shafts 75 and 76 are journalled within bottom wall 37 by way of suitable bearings 77 and 78. The barrels 47 and 48 are coupled to associated spindles 49 and 50 by way of slip clutch mechanisms 79 and 80. Inasmuch as the slip clutch mechanisms are identical in construction, an explanation of one will suffice for an understanding of both.

The barrels 47 and 48 each have closed ends 81 adjacent the gear assembly encased by gear box housing 11 and internally threaded open ends 82. The barrel closed ends 81 define clutch surfaces 83. The barrels 47 and 48 are substantially hollow to define bores or clutch chambers 84.

Urged upwardly against clutch surfaces 83 are slip clutch plates 85 held in position by clutch surfaces 86 defined by enlarged heads 87 of the spindles 49 and 50. Held securely within the clutch chambers 84 is a pair of coiled compression springs 88 whose upper ends bear resiliently against enlarged heads 87 and whose lower ends bear resiliently against a pair of plugs 89. Plugs 89 are externally threaded for selective interengagement within the barrel open ends 82.

The plugs 89 constitute a torque adjustment means. By inserting the plugs 89 deeper into the barrels 47 and 48, the torque overload limit may be increased. Under normal conditions the torque adjustment means would be manipulated to set the torque release units 45 and 46 for approximately 60 in-lbs. of torque. Under these conditions if torque were increased beyond 60 in-lbs. then one or both of the clutch surfaces 83 and 86 would commence slipping over the plates 85 to relieve strain and avoid possible breakage or malfunctions.

The clutch chambers 84 as well as the gear box 11 are at least partially filled with lubricating oil in order to maintain smooth operation of the clutch mechanisms 79 and 80 and the gear assembly constituted by gears 70, 71, 73 and 74.

Brace arm 19 of the brace 17 mounts a clip 90 by way of a connecting bolt 91. Clip 90 may be used by a pipe fitter or other workman to hang the power drive wrench 10 from his belt so that it can be easily carried and conveniently located.

OPERATION

Keeping the above construction in mind it can be understood how the previously described disadvantages of conventional mechanisms for tightening dual fasteners are overcome or substantially eliminated by the present invention.

A pipe fitter, plumber or other workman may easily carry the power drive wrench 10 to a job location by attaching it to his belt or the like by way of clip 90. After a "no-hub coupling" or pipe joint 55 has been loosely assembled over the adjacent ends of pipes 53 and 54, the input drive shaft 12 is coupled to chuck 35 and the clamping screws 22 and 23 are urged inwardly to engage opposing sides of the portable electrical power drill 30.

With the power drive wrench 10 stably mounted to drill 30, the wrench socket heads 51 and 52 are slipped over the fasteners 62 and 63 of tightening units 60 and 61. By actuating drill trigger 32 chuck 35 causes input drive shaft 12 to rotate. This rotary motion is transmitted through the gear assembly and the torque release units 45 and 46 are caused to rotate simultaneously in the same direction.

The fasteners 62 and 63 are tightened simultaneously so that both ends of the packing member 56 and clamping band 57 are tightened gradually, at about the same rate and uniformly. Misalignment, buckling and possible shearing of the pipe joint 55 are thereby prevented. When the torque overload limit previously established or determined for the fasteners 62 and 63 has been attained, then the slip clutch mechanisms 79 and 80 will cause the desired slippage to avoid damage to the pipe joint 55 and wrench 10.

From the foregoing it will be evident that the present invention has provided a power drive wrench in which all of the various advantages are fully realized.

What is claimed is:

1. A power drive wrench for simultaneously tightening plural fasteners of a "no-hub" type coupling for a pipe joint, comprising:
   a dual torque release units aligned in parallel side-by-side relationship and having force transmitting elements in the form of socket heads for simultaneously engaging fasteners of a "no-hub" type coupling for a pipe joint, each torque unit release unit including:
- a.1 a slip clutch including a coil spring and clutch plate;
- a.2 a barrel having a closed end that constitutes a first clutch surface engaging one face of the clutch plate;
- a.3 an output drive spindle partially inserted within and coupled to the barrel and output drive spindle, the output drive spindle having an enlarged head constituting a second clutch surface and engaging the other face of the clutch plate; and,
- a.4 torque adjustment means for regulating the torque overload limit;
- a.5 wherein the coil spring surrounds a segment of the output drive spindle and is arranged with its opposite ends urged against the spindle's enlarged head and torque adjustment means;
- b an input drive shaft arranged for driving engagement with a prime mover;
- c a gear assembly interconnecting the input drive shaft and the barrels of the dual torque release units, the gear assembly being operationally engaged with the torque release unit in a manner to cause the force transmitting elements to simultaneously tighten fasteners of a "no-hub" type coupling of a pipe joint — the gear assembly specifically including:
- c.1 an input gear fixed to the input drive shaft;
- c.2 a pair of output gears with stub shafts fixed to the barrels and
- c.3 an intermediate gear positioned to transmit rotary motion from the input gear to the output gears and cause the output gears to rotate in the same direction,
- d a housing for the gear assembly formed in opposing side sections with locking slots that are aligned generally parallel to the input drive shaft; and
- e a brace connected to the housing for holding the housing steady with respect to a prime mover, the brace including a pair of parallel arms coupled within the locking slots and which carry releasable clamps for engagement with the prime mover.

2. The structure according to claim 1, wherein;
the barrel has an internally threaded open end, and, the torque adjustment means includes an externally threaded plug interengaged with the barrel open end,
wherein the torque overload limit may be increased by screwing the plug deeper into the barrel.

3. The structure acccording to claim 1, including:
a clip connected to one arm for use in hanging the wrench on a person's belt.

4. The structure according to claim 1, including:
a prime mover in the form of a portable electrical unit having a chuck attached to the input drive shaft.

* * * * *